United States Patent [19]

Cason, Jr. et al.

[11] 3,739,864
[45] June 19, 1973

[54] PRESSURE EQUALIZING SYSTEM FOR ROCK BITS
[75] Inventors: George Acker Cason, Jr., Dallas; James Wesley Simmons, Euless, both of Tex.
[73] Assignee: Dresser Industries, Inc., Dallas, Tex.
[22] Filed: Aug. 12, 1971
[21] Appl. No.: 171,053

[52] U.S. Cl............................. 175/228, 175/372
[51] Int. Cl........................... E21b 9/08, E21b 9/35
[58] Field of Search ................. 175/337, 340, 371, 175/372, 228; 308/8.2

[56] References Cited
UNITED STATES PATENTS
3,476,195  11/1969  Galle................................. 175/228
3,127,942  4/1964  Neilson........................... 175/337 X
3,534,823  10/1970  Frederick........................... 175/337

Primary Examiner—David H. Brown
Attorney—Robert W. Mayer, Thomas P. Hubbard, Jr., Daniel Rubin

[57] ABSTRACT

A lubricant reservoir is positioned in each of the three arms of a three cone rotary rock bit to provide lubricant to the bearings located between the cone cutters and the bearing shafts upon which they rotate. A seal is positioned between the cone cutters and the bearing shafts to retain lubricant in the bearing area and to prevent borehole fluids and debris from entering the bearing area. A flexible diaphragm positioned in the lubricant reservoir divides the reservoir into a lubricant portion and a pressure equalizing portion. A vent passage extends from the pressure equalizing portion of the lubricant reservoir to an area on the exterior surface of the bit wherein the borehole fluid pressure on the bit is substantially the same as the borehole fluid pressure on the seal.

18 Claims, 3 Drawing Figures

PATENTED JUN 19 1973

INVENTORS:
GEORGE A. CASON, JR.
JAMES W. SIMMONS

Eddie E. Scott

ATTORNEY

PRESSURE EQUALIZING SYSTEM FOR ROCK BITS

BACKGROUND OF THE INVENTION

The present invention relates to the art of earth boring and more particularly to a system for equalizing pressures in a rotary rock bit.

When a rotary rock bit is lowered into a well bore, the environmental pressure surrounding the bit increases at the rate of approximately one-half pound per square inch for each foot of depth. This means that at a depth of 10,000 feet the hydrostatic pressure on the outside of the bit could be 5,000 pounds per square inch or more because of the weight of the drilling fluid in the hole above the bit. Sealed bearing rotary rock bits include a lubricant reservoir that supplies lubricant to the bearings that are provided to promote rotation of the rotatable cutters. In order for the lubrication system to function properly at the pressures mentioned above, some means must be provided to equalize the internal pressure of the lubricant in the lubricant reservoir and around the bearings with the hydrostatic pressure of the drilling fluid in the well bore. This is generally accomplished by providing a flexible diaphragm assembly in the lubricant reservoir. The area of the lubricant reservoir outside of the flexible diaphragm is vented to the well bore and the diaphragm keeps the lubricant from becoming contaminated by the drilling fluid.

The flexible diaphragm and lubricant reservoir generally function satisfactorily while the bit is on the bottom of the hole and drilling. However, during the drilling operation joints of pipe must be added to the drill string. This may mean that 50 or 60 joints of pipe are added to the drill string during the normal life of a sealed bearing rotary rock bit. In order to add a joint of drill pipe, which are usually 30 feet in length, rotation of the drill bit must be stopped and the entire string of pipe including the bit must be raised sufficiently high to allow the kelly to clear the rotary table (35 to 50 feet). Since operating costs of an oil well drilling rig are quite high, the time that the bit is off bottom and not drilling must be kept to a minimum. Therefore, the addition of the joint of drill pipe must be accomplished rapidly and the drill stem must be raised and lowered as rapidly as possible. This raising and lowering of the drill stem creates problems that have resulted in the destruction of the lubrication systems of sealed bearing rock bits of the prior art.

The diameter of the body of the bit is larger than the diameter of the drill pipe and as the drill stem is elevated in the well bore, the bit body acts in much the same manner as a piston in a cylinder. The upper surface of the bit wherein the reservoir vents are generally located exerts a force on the column of mud above it due to the velocity of the bit traveling up the hole, thus creating a high pressure zone in the vent area of the prior art bits. In addition, the diameter of the bit body in the area wherein the seals are located is larger than the diameter of the bit at the vent area. As a result, the fluid velocity past the seals may be three or four times as fast as it is past the reservoir vents. This relatively high velocity of the fluid in the area of the bit wherein the seals are located creates a low pressure in this zone. Consequently, the pressure differential between the seal area and the reservoir vent area resulting from the velocity of the bit traveling up hole may be in the order of 100 pounds per square inch or more during periods of high acceleration of the drill stem.

The majority of rotary rock bit seals are designed to hold pressure in one direction only. If the pressure on the inside of the bit reaches 50 to 75 pounds per square inch greater than the pressure on the outside of the bit, the seals will in all probability leak. Since the lubricant reservoir conducts lubricant into the area enclosed by the seal, a high pressure in the reservoir vent area will result in a high pressure on the bearing side of the seal and the seal will leak. In the same manner, a low pressure in the borehole area proximate the seals will result in a pressure differential across the seal and the seal will leak. Thus, each time a joint of pipe is added to the drill string, the bit is elevated in the hole causing a pressure differential across the seal and a portion of the lubricant is forced out past the seal. After the supply of lubricant is pumped out in this manner, the pressure pulses continue to act against the flexible diaphragm causing it to rupture against the lubricant passageway. The lubrication system consequently fails and the bearings cannot continue to operate. If a pressure equalizing system could be provided to prevent lubrication system failure, the life of sealed bearing rock bits would be extended.

BRIEF DESCRIPTION OF THE PRIOR ART

In U.S. Pat. No. 3,370,895 to G. A. Cason, Jr. patented Feb. 27, 1968, a sealed bearing rock bit with a lubricant reservoir is shown. A movable piston is positioned in the lubricant reservoir and the area above the piston is vented to expose the upper side of the piston to the environmental pressure in the well bore.

In U.S. Pat. No. 3,476,195 to E. M. Galle patented Nov. 4, 1969, a sealed bearing rock bit is shown that includes a lubricant reservoir and a flexible diaphragm for equalizing the internal pressure of the lubricant in the lubricant reservoir with the hydrostatic pressure of the drilling fluid in the well bore. Two distinct systems for venting the area of the lubricant reservoir outside of the flexible diaphragm to the well bore are shown. One system, shown in FIG. 4, consists of venting the reservoir through small holes or ports in the reservoir cap. With this venting system, the lubricant is pumped out of the bit because of the piston action when the bit is being raised and lowered in the well bore. The other venting system consists of venting the area outside of the flexible diaphragm into the dome of the bit as shown in FIG. 1 of the patent. This system also results in the lubricant being pumped from the bit because a high pressure zone exists in the center of the dome portion of the bit and the ram effect of the bit as it is lowered back into the bottom of the well bore after a new section of pipe has been added creates a pumping effect.

SUMMARY OF THE INVENTION

The present invention provides a system for equalizing the pressure in a rock bit lubricant reservoir with the hydrostatic pressure of the drilling fluid in the area of the seal. A pressure equalizing structure is positioned in the lubricant reservoir and divides the lubricant reservoir into a lubricant portion and a pressure equalizing portion. A lubricant passageway extends from the lubricant reservoir to the bearings positioned between the rotatable cutter and the bearing pin. A seal between the cutter and the bearing pin retains lubricant in the area of the bearings and prevents fluid in the well bore from entering the bearing area. A vent passageway extends from the pressure equalizing portion of the lubricant reservoir to an area on the exterior surface of the bit wherein the hydrostatic pressure in the well bore is essentially the same as the hydrostatic pressure in the well bore at the seal.

It is therefore an object of the present invention to provide an improved pressure equalizing system for a sealed bearing rock bit.

It is a further object of the present invention to provide a pressure equalizing system for a sealed bearing rock bit wherein the hydrostatic pressure exerted on the pressure equalizing structure is virtually the same at all times as the hydrostatic pressure exerted on the external surface of the seal.

It is a further object of the present invention to provide a pressure equalizing system for a sealed bearing rock bit wherein the integrity of a pressure equalizing flexible diaphragm is maintained by preventing large pressure differentials from occurring between the pressure of the lubricant on the flexible diaphragm and the pressure of borehole fluid on the flexible diaphragm.

It is a further object of the present invention to provide a pressure equalizing system that will extend the life of sealed bearing rock bits.

The above and other objects and advantages will become apparent from a consideration of the following detailed description of the invention when taken in conjunction with the accompanying drawings.

DETAILED DESCRIPTION OF THE INVENTION

Figure 1:
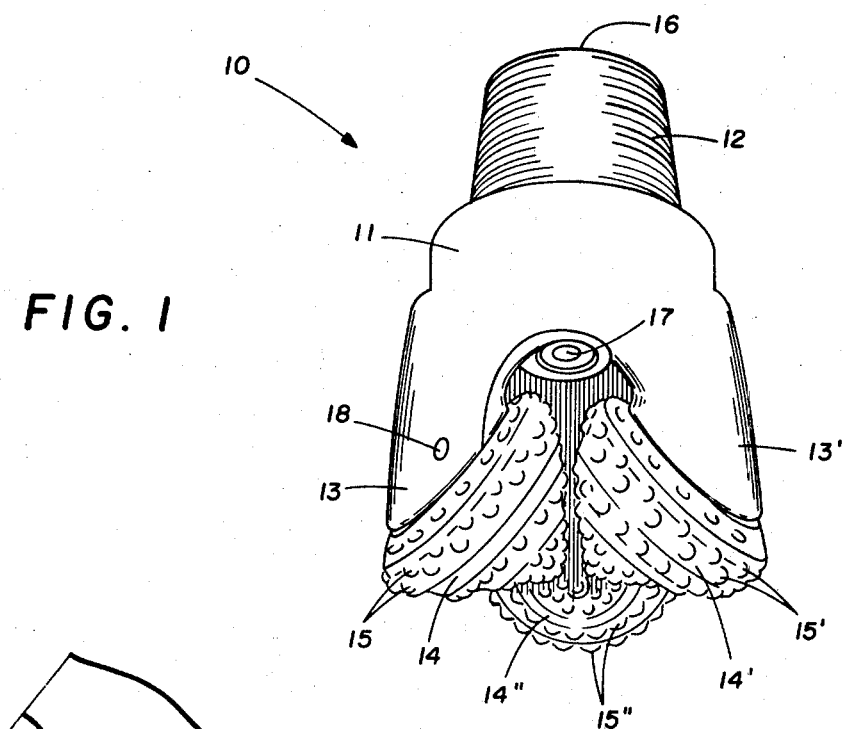
FIG. 1 shows a three cone rotary rock bit constructed in accordance with the present invention.

Referring now to the drawings and to FIG. 1 in particular, shown therein and generally designated by the reference character 10 is a three cone rotary rock bit. As illustrated, the bit 10 includes a bit body 11 including an upper threaded portion 12. The threaded portion 12 allows bit 10 to be connected to the lower end of a rotary drill string (not shown). Depending from the bit body 11 are three substantially identical arms 13, 13', 13''. The lower end of each of the arms is provided with an extended journal portion and the details of this journal portion will be discussed subsequently. Three rotary cone cutters 14, 14', 14'' are rotatably positioned upon the three journals extending from the arms. Each of the cone cutters includes cutting structure 15, 15', 15'' on its outer surface adapted to disintegrate the formations as the bit is rotated and moved downward. The cutting structure 15, 15', 15'' is shown in the form of tungsten carbide inserts; however, it is to be understood that other cutting structure such as steel teeth may be used as the cutting structure on the cone cutters.

The bit 10 includes a central passageway 16 extending along the central axis of body 11 to allow drilling fluid to enter from the upper section of the drill string immediately above and pass downward through the jet nozzles (three nozzles are included in bit 10 but only one nozzle 17 is shown in FIG. 1) past the cutting structure of the cone cutters. In use, the drill bit 10 is connected as the lower member of a rotary drill string (not shown) and lowered into a well bore until the rotatable cone cutters 14, 14', 14'' engage the bottom of the well bore. Upon engagement with the bottom of the well bore, the drill string is rotated, rotating bit 10 therewith. Drilling fluid is forced down through the interior passage of the rotary drill string and continues through the central passageway 16 of bit 10 passing through nozzles 17, past the cutting structure of the cutters to the bottom of the well bore, thence upward in the annulus between the rotary drill string and the wall of the well bore, carrying with it the cuttings and debris from the drilling operation. In order to add additional sections of the drill string, the bit 10 must be lifted a short distance in the well bore, the new section of drill string added and the bit 10 lowered until it again reaches the bottom of the well bore, wherein drilling continues.

As each section of the drill string is added, the bit is elevated in the hole causing a high pressure at certain areas along the bit. In prior art sealed bearing rock bits, the lubricant would be pumped out past the seal. The loss of lubricant of course has a deleterious effect on the bearing systems and the bit is subject to early failure. In addition, the periodic pressure differentials may result in seal leakage or destruction of the pressure equalizing structure in the lubricant reservoir. The pressure equalizing structure in the lubricant reservoir may consist of a movable piston as shown in U.S. Pat. No. 3,370,895 to G. A. Cason, Jr., patented Feb. 27, 1968, a flexible diaphragm as shown in U.S. Pat. No. 3,476,195 to E. M. Galle, patented Nov. 4, 1969, or other structures that will serve to transmit the pressure of fluid in the well bore to the lubricant in the lubricant reservoir. The pressure equalizing structure will be described hereinafter as a flexible diaphragm; however, it is to be understood that other pressure equalizing structure could be provided without departing from the scope of the present invention. After the supply of lubricant has been pumped out of the reservoir, the high pressure pulses continue to act against the flexible diaphragm causing it to rupture against the lubricant passageway. Fluid from the well bore is introduced to the bearing systems and the bit fails. The present invention includes a lubricant reservoir pressure equalizing system with the external pressure sensing vents or ports 18, 18', 18'' located on a surface of the bit where the hydrostatic pressure exerted by the drilling fluid is virtually the same at all times as the pressure on the external surface of the seal. The external vents 18, 18', 18'' are positioned on the trailing side of the arms 13, 13', 13'' as the bit 10 rotates and positioned in an area that is subjected to the same operational pressures as the external surface of the seal.

Figure 2:
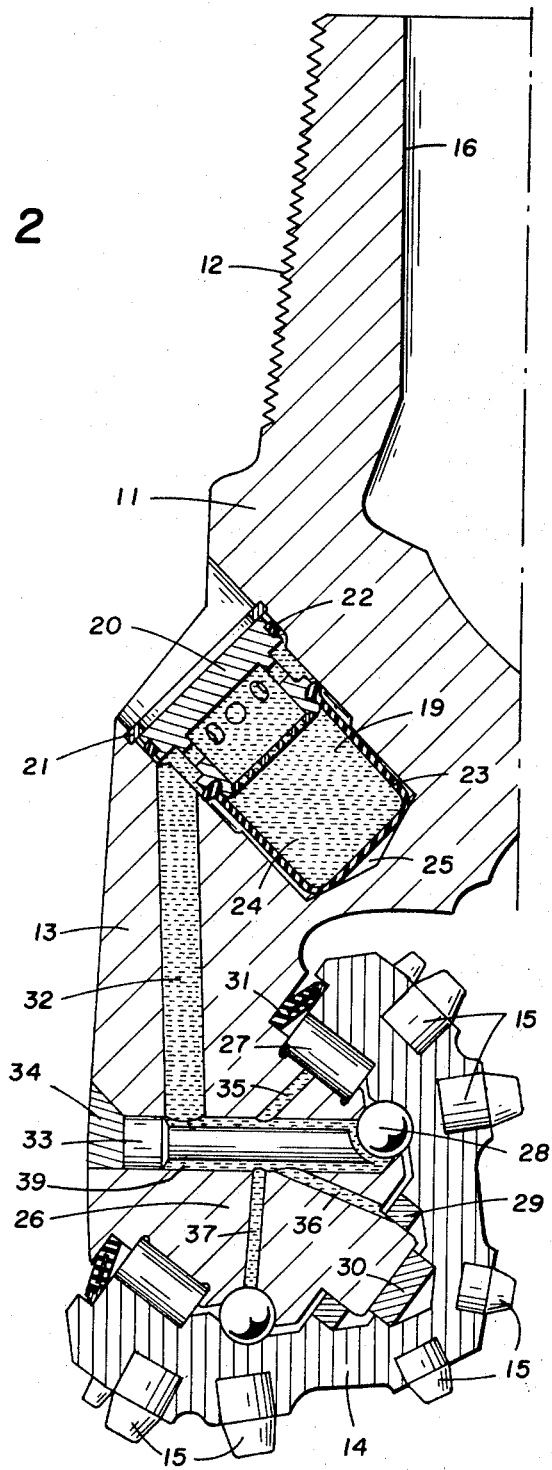
FIG. 2 is a sectional view of one arm of the rock bit of FIG. 1 showing the lubrication system.

Referring now to FIG. 2, one arm 13 of the rotary rock bit 10 is shown in section. The arm 13 contains a lubricant reservoir 19. The upper end of the lubricant reservoir 19 is closed by a cap or plug 20 held in place by a snap ring 21. An O-ring seal 22 is positioned around plug 20 to insure a fluid tight seal with the arm 13. A flexible diaphragm 23 divides the lubricant reservoir 19 into a lubricant portion 24 and a pressure equalizing portion 25. The lubricant portion 24 of the lubricant reservoir 19 is connected to the bearing area between the rotatable cone cutter 14 and the bearing pin 26 upon which the cone cutter 14 is mounted. The bearing systems in the bearing area include a series of roller bearings 27, a series of ball bearings 28, a friction bearing 29, and a thrust button 30. A seal 31 is positioned between the cone cutter 14 and bearing pin 26. This seal 31 retains lubricant in the bearing area around the individual bearing systems and prevents any materials in the well bore from entering the bearings. Passageways 32 and 39 extend from the lubricant portion 24 of the lubricant reservoir 19 to the area around the bearings to allow lubricant to be transmitted to the bearings. The passageway 39, as shown, allows the balls that make up the ball bearing system 28 to be inserted into position after the cone cutter 14 is placed on the bearing pin 26. The series of ball bearings 28 serve to lock the cone cutter 14 on bearing pin 26. After the balls are in place, a plug 33 is inserted into the passageway 39 and welded therein by weld 34. Plug 33 has a reduced diameter throughout the major portion of its length to allow lubricant to be transmitted to the bearing area. Additional passageways 35, 36, and 37 extend from passageway 39 to the bearing area to insure a sufficient supply of lubricant to bearings 27, 28, 29 and 30.

Figure 3:
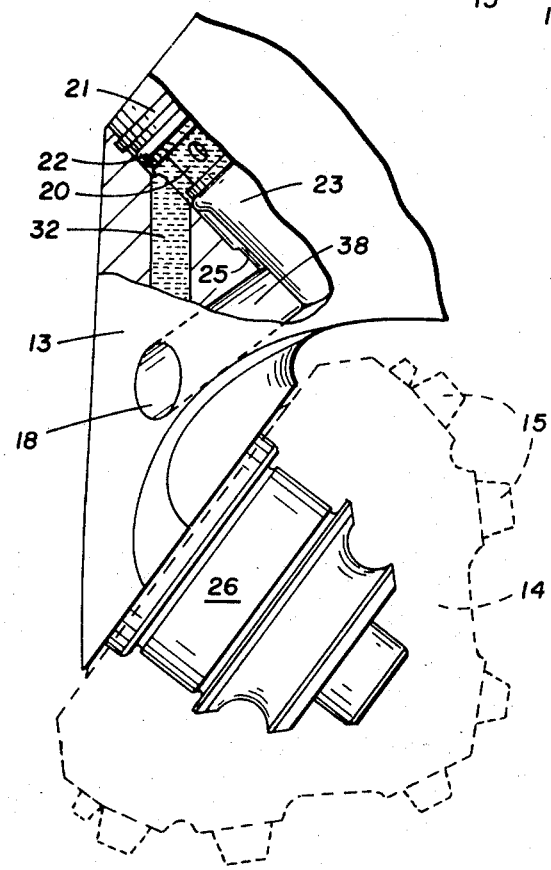
FIG. 3 is a sectional view of the rock bit of FIG. 1 showing the pressure equalizing vent passageway.

Referring now to FIG. 3 another view of the arm 13 of bit 10 is shown illustrating the vent passageway of the pressure equalizing system of the present invention. A passageway 38 extends from the pressure equalizing portion 25 of the lubricant reservoir 19 to the external port or vent 18. Pressure information may be transmitted to the flexible diaphragm 23 through passageway 38 from vent 18 which is located well below the zone of maximum cross-sectional area of the bit. Therefore, the vent 18 is located in an area where the hydrostatic pressure in the well bore and the fluid velocity during the raising and lowering of the bit is essentially the same as it is at the seal 31. Since the seal 31 is designed to hold pressure in one direction only, that being from the fluid in the well bore to the bearing area, a pressure differential across the seal can result in loss of lubricant. If pressure of the lubricant in the lubricant reservoir 19 in the passageways 32, 35, 36, 37 and 39 from the lubricant reservoir and in the bearing areas reaches 50 to 75 pounds per square inch greater than the pressure on the outside of the bit, lubricant will be forced outward past the seal 31 into the well bore. The present invention prevents a pressure differential from being built up across the seal 31 by locating the external vent 18 at a point on the bit wherein the fluid pressure is substantially the same at all times as it is at the seal. Drilling fluid that enters the lubricant reservoir area through vent 18 is kept isolated from the lubricant by the integral O-ring seal portion of the diaphragm 23.

Reservoir vent passageways of prior art rotary rock bits have tended to become clogged because of accumulation of debris within the passageway. As shown in FIG. 3, the passageway 38 provides natural drainage of the drilling fluid which usually contains formation cuttings by having the vent 18 as the lowest point in the mud portion of the system. The passageway 38 is inclined downward and thus preventing the accumulation of any debris that would block the passageway 38. In addition, the external vent 18 has a minimum exposure to the flow of fluids in the well bore and debris does not accumulate in the passageway 38.

The embodiments of the invention in which an exclusive property or privilege is claimed are defined as follows:

1. A rotary rock bit for use in a drilling operation wherein fluid is circulated through a well bore, comprising:
    a bit body;
    at least one arm extending from said bit body;
    a cone cutter rotatably mounted upon said arm;
    bearing means between said cone cutter and said arm for promoting rotation of said cone cutter;
    a lubricant reservoir in said arm;
    a lubricant passageway through said arm whereby lubricant from said lubricant reservoir may be transmitted to said bearing means;
    a seal positioned between said cone cutter and said arm for retaining lubricant proximate said bearing means and for preventing fluid in the well bore from contacting said bearing means;
    pressure equalizing means positioned in said lubricant reservoir for equalizing the lubricant pressure and the pressure of fluid in the well bore, said pressure equalizing means dividing said lubricant reservoir into a lubricant portion and pressure equalizing portion; and
    a vent passageway extending from said pressure equalizing portion of said lubricant reservoir to an area on the exterior surface of said arm wherein the hydrostatic pressure of fluid in the well bore is essentially the same as it is at the seal throughout the drilling operation, said area on the exterior surface of said arm being an area where the fluid velocity during raising and lowering of the bit is essentially the same as the fluid velocity at the seal.

2. The bit of claim 1 wherein said area on the exterior surface of said arm is located below said lubricant reservoir.

3. The bit of claim 1 wherein said vent passageway extends downward from said lubricant reservoir.

4. The bit of claim 1 wherein said area on the exterior surface of said arm is proximate said seal.

5. The bit of claim 1 wherein said area on the exterior surface of said arm is located on the trailing side of the arm during the drilling operation.

6. The bit of claim 1 wherein said bearing means includes at least one friction bearing.

7. The bit of claim 1 wherein said bearing means includes a series of roller bearings.

8. The bit of claim 1 wherein said bearing means includes a series of ball bearings.

9. The bit of claim 1 wherein said pressure equalizing means is a flexible diaphragm.

10. The bit of claim 1 wherein said pressure equalizing means is an element positioned in said lubricant reservoir that transmits pressure information from the fluid in the well bore to the lubricant.

11. A drill bit for use in a drilling operation wherein fluid is circulated through a well bore, comprising:
    a bit body;
    at least one arm extending from said bit body, said arm terminating in a bearing shaft;
    a cone cutter rotatably mounted upon said bearing shaft;
    bearing means supporting said cone cutter for promoting rotation of said cone cutter upon said bearing shaft;
    a seal positioned between said cone cutter and said bearing shaft;
    a lubricant reservoir positioned in said arm;

a passageway through said arm and said bearing shaft wherein lubricant from said lubricant reservoir may be transmitted to the area between the cone cutter and the bearing shaft;

a flexible diaphragm positioned in said lubricant reservoir and dividing said lubricant reservoir into a lubricant portion and a pressure equalizing portion; and a vent passageway extending from said pressure equalizing portion of said lubricant reservoir to an area on the exterior surface of said arm wherein the hydrostatic pressure of fluid in the well bore is essentially the same as it is at the seal throughout the drilling operation, said area on the exterior surface of said arm being an area where the fluid velocity during raising and lowering of the bit is essentially the same as the fluid velocity at the seal.

12. The bit of claim 11 wherein said area on the exterior surface of said arm is located below said lubricant reservoir.

13. The bit of claim 12 wherein said vent passageway extends downward from said lubricant reservoir.

14. The bit of claim 13 wherein said area on the exterior surface of said arm is proximate said seal.

15. The bit of claim 14 wherein said area on the exterior surface of said arm is located on the trailing side of the arm during the drilling operation.

16. The bit of claim 15 wherein said bearing means includes at least one friction bearing.

17. The bit of claim 15 wherein said bearing means includes a series of roller bearings.

18. The bit of claim 15 wherein said bearing means includes a series of ball bearings.

* * * * *